T. S. GRANNIS.
FREIGHT LOADING MEANS.
APPLICATION FILED APR. 9, 1918.

1,412,861.

Patented Apr. 18, 1922.
5 SHEETS—SHEET 1.

Fig. 1.

LOADING LIST — INITIALS — CAR NUMBERS

| Train Section TRACK 1 "A" | | | Train Section TRACK 2 "B" | | | Train Section TRACK 3 "C" | | | Train Section TRACK 4 "D" | | | Train Section TRACK 5 "E" | | | Train Section TRACK 6 "F" | | | Train Section TRACK 7 "G" | | |
|---|---|---|---|---|---|---|---|---|---|---|---|---|---|---|---|---|---|---|---|---|
| Train Loading No. | CAR Initial | CAR Number | Train Loading No. | CAR Initial | CAR Number | Train Loading No. | CAR Initial | CAR Number | Train Loading No. | CAR Initial | CAR Number | Train Loading No. | CAR Initial | CAR Number | Train Loading No. | CAR Initial | CAR Number | Train Loading No. | CAR Initial | CAR Number |
| 53 West | 101-1 | Albert Lea, Minn. | 55 South | 201-1 | Martin, Tenn. | 73 South | 301-1 | Vergennes, Ill. | 79 South | 401-1 | Bluefield, W.Va. | 51 West | 501-1 | Waterloo, Ia. | 53 South | 601-1 | So. Chicago, Ill. | 73 South | 701-1 | Topeka, Kan. |
| 53 West | 102-1 | Osage, Ia. | 55 South | 202-1 | Nashville, Tenn. | 73 South | 302-1 | Herrin, Ill. | 79 South | 402-1 | Knoxville, Tenn. | 51 West | 502-1 | Waterloo, Ia. | 53 South | 602-1 | So. Chicago, Ill. | 73 South | 702-1 | Topeka, Kan. |
| 53 West | 103-1 | Janesville, Ia. | 55 South | 203-1 | Atlanta, Ga. | 73 South | 303-1 | Carbondale, Ill. | 79 South | 403-1 | Dayton, Ohio | 51 West | 503-1 | Waterloo, Ia. | 53 South | 603-1 | So. Chicago, Ill. | 73 South | 703-1 | Rochester, Minn. |
| 53 West | 104-1 | Minneapolis, Minn. | 55 South | 204-1 | Birmingham, Ala. | 73 South | 304-1 | Carterville, Ill. | 79 South | 404-1 | Atlanta, Ga. | 51 West | 504-1 | Sioux City, Ia. | 53 South | 604-1 | So. Chicago, Ill. | 73 South | 704-1 | Harvey Iron, Ill. |
| 53 West | 105-1 | Minneapolis, Minn. | 55 South | 205-1 | Florida Transfer, Fla. | 73 South | 305-1 | Anna, Ill. | 79 South | 405-1 | Chattanooga, Tenn. | 51 West | 505-1 | Sioux City, Ia. | 53 South | 605-1 | St. Louis, Mo. | 73 South | 705-1 | Harvey Iron, Ill. |
| 53 West | 106-1 | Minneapolis, Minn. B | 55 South | 206-1 | Paducah, Ky. | 73 South | 306-1 | Du Quoin, Ill. | 79 South | 406-1 | Birmingham, Ala. | 51 West | 506-1 | Le Mars, Ia. | 53 South | 606-1 | St. Louis, Mo. | 73 South | 706-1 | Harvey Iron, Ill. |
| 53 West | 107-1 | St. Paul, Minn. | 55 South | 207-1 | Little Rock, Ark. | 73 South | 307-1 | Du Quoin, Ill. | 79 South | 407-1 | C—O | 51 West | 507-1 | Sheldon, Ia. | 53 South | 607-1 | St. Louis, Mo. | 73 South | 707-1 | Harvey Iron, Ill. |
| 53 West | 108-1 | Minn. Tfr., Minn. | 55 South | 208-1 | Jackson Tfr., Miss. | 73 South | 308-1 | Cairo, Ill. | 79 South | 408-1 | Hamlet, N.C. | 51 West | 508-1 | Cherokee, Ia. | 53 South | 608-1 | St. Louis, Mo. | 73 South | 708-1 | Harvey Iron, Ill. |
| 53 West | 109-1 | Independence, Ia. | 55 South | 209-1 | N.H. New Orleans, La. | 73 South | 309-1 | Cairo, Ill. | 79 South | 409-1 | Roanoke, Va. | 51 West | 509-1 | Webster City, Ia. | 53 South | 609-1 | St. Louis Tfr., Mo. | 73 South | 709-1 | Harvey Iron, Ill. |
| 53 West | 110-1 | Cedar Rapids, Ia. | 55 South | 210-1 | D.H. New Orleans, La. | 73 South | 310-1 | Mounds, Ill. | 79 South | 410-1 | Lynchburg N.&W. | 51 West | 510-1 | Barnum, Ia. | 53 South | 610-1 | Cotton Belt, Ark. | 73 South | 710-1 | Harvey Iron, Ill. |
| 53 West | 111-1 | Manchester, Ia. | 55 South | 211-1 | Memphis P.H., Tenn. | 73 South | 311-1 | Centralia, Ill. | 79 South | 411-1 | Cincinnati, Ohio | 51 West | 511-1 | Ft. Dodge, Ia. | 53 South | 611-1 | Kansas City, Kas. | 73 South | 711-1 | Harvey Iron, Ill. |
| 53 West | 112-1 | Warren, Ill. | 55 South | 212-2 | D&M Memphis, Tenn. | 73 South | 312-1 | Champaign, Ill. | 79 South | 411-1 | Cincinnati, Ohio | 51 West | 511-2 | Omaha, Neb. | 53 South | 612-1 | Belleville, Ill. | 73 South | 711-2 | Harvey Iron, Ill. |
| 53 West | 113-1 | Rockford, Ill. | 55 South | 213-1 | Vicksburg, Miss. | 73 South | 313-1 | Edgewood, Ill. | 79 South | 412-1 | Cincinnati, Ohio | 51 West | 512-1 | U.P. Tfr. | 53 South | 612-2 | Springfield, Ill. | 73 South | 712-1 | So. Chicago, Ill. |
| | | | | | | 73 South | 314-1 | Champaign, Ill. | 79 South | 421-1 | Crane, Ind. | | | | 53 South | 613-1 | Gilman, Ill. | 73 South | 721-1 | Bloomington, Ill. |
| 79 South | 131-1 | Hudson, N.Y. | 79 South | 231-1 | So. Pac. | 73 South | 331-1 | Monticello, Ill. | 79 South | 431-1 | Raub, Ind. | | | | 53 South | 631-1 | Ridgeville, Ill. | 73 South | 731-1 | Pontiac, Ill. |
| 79 South | 137-1 | Syracuse, N.Y. | 79 South | 232-1 | New Orleans, La. | 73 South | 332-1 | Lodge, Ill. | 79 South | 432-1 | Aroma, Ill. | | | | 53 South | 632-1 | Freeport, Ill. | 73 South | 732-1 | Griswold, Ill. |
| 79 South | 138-4 | Syracuse, N.Y. | 79 South | 233-4 | New Orleans, La. | 73 South | 333-1 | Leverett, Ill. | 79 South | 433-1 | Norfolk N.W. Va. | | | | 53 South | 633-1 | Freeport, Ill. | 73 South | 733-1 | |
| 79 South | 139-1 | Syracuse, N.Y. | 79 South | 234-1 | New Orleans, La. | 73 South | 334-1 | | 79 South | 434-1 | | | | | 53 South | 634-1 | Atchison, Kan. | 73 South | 734-1 | |
| 79 South | 140-1 | Syracuse, N.Y. | 79 South | 235-1 | New Orleans, La. | 73 South | 335-1 | | 79 South | 435-1 | | | | | 55 South | 635-1 | Freeport, Ill. | 73 South | 735-1 | |
| | | | | | | | | | | | | | | | 53 South | 644-1 | | | | |
| 53 West 149 South 7:20 P.M.–6:50 P.M. | | | 55 South – 7:00 P.M. | | | 73 South – 6:20 P.M. | | | 79 South – 6:30 P.M. | | | 51 West – 7:00 P.M. | | | 53 South – 6:10 P.M. | | | 73 South – 6:40 P.M. | | |

Witnesses:
C. E. Wessels.
B. G. Richards

Inventor:
Thomas S. Grannis,
By Joshua R. H. Potts
his Attorney.

T. S. GRANNIS.
FREIGHT LOADING MEANS.
APPLICATION FILED APR. 9, 1918.

1,412,861. Patented Apr. 18, 1922.
5 SHEETS—SHEET 2.

*Fig. 2.*

LOADING LIST — STATION — DISTRICT NUMBERS

| Train Section TRACK 1-"A" | | Train Section TRACK 2-"B" | | Train Section TRACK 3-"C" | | Train Section TRACK 4-"D" | | Train Section TRACK 5-"E" | | Train Section TRACK 6-"F" | | Train Section TRACK 7-"G" | |
|---|---|---|---|---|---|---|---|---|---|---|---|---|---|
| Station No. / District No. | Train Loading No. | Station No. / District No. | Train Loading No. | Station No. / District No. | Train Loading No. | Station No. / District No. | Train Loading No. | Station No. / District No. | Train Loading No. | Station No. / District No. | Train Loading No. | Station No. / District No. | Train Loading No. |
| Albert Lea, Minn. 53 West | 101-1 | Martin, Tenn. 55 South | 201-1 | Vergennes, Ill. 73 South | 301-1 | Bluefield, W.Va. 79 South | 401-1 | Waterloo, Ia. 51 West | 501-1 | So. Chicago, Ill. 53 South | 601-1 | Topeka, Kan. 73 South | 701-1 |
| Osage, Ia. 53 West | 102-1 | Nashville, Tenn. 55 South | 202-1 | Herrin, Ill. 73 South | 302-1 | Knoxville, Tenn. 79 South | 402-1 | Waterloo, Ia. 51 West | 502-1 | So. Chicago, Ill. 53 South | 602-1 | Topeka, Kan. 73 South | 702-1 |
| Janesville, Ia. 53 West | 103-1 | Atlanta, Ga. 55 South | 203-1 | Carbondale, Ill. 73 South | 303-1 | Dayton, Ohio 79 South | 403-1 | Waterloo, Ia. 51 West | 503-1 | So. Chicago, Ill. 53 South | 603-1 | Rochester, Minn. 73 South | 703-1 |
| Minneapolis, Minn. 53 West | 104-1 | Birmingham, Ala. 55 South | 204-1 | Carterville, Ill. 73 South | 304-1 | Atlanta, Ga. 79 South | 404-1 | Sioux City, Ia. 51 West | 504-1 | So. Chicago, Ill. 53 South | 604-1 | Harvey, Iron, Ill. 73 South | 704-1 |
| Minneapolis, Minn. 53 West | 105-1 | Florida Transfer, Fla. 55 South | 205-1 | Anna, Ill. 73 South | 305-1 | Chattanooga, Tenn. 79 South | 405-1 | Sioux City, Ia. 51 West | 505-1 | St. Louis, Mo. 53 South | 605-1 | Harvey, Iron, Ill. 73 South | 705-1 |
| Minneapolis, Minn. B 53 West | 106-1 | Paducah, Ky. 55 South | 206-1 | DuQuoin, Ill. 73 South | 306-1 | Birmingham, Ala. 79 South | 406-1 | Le Mars, Ia. 51 West | 506-1 | St. Louis, Mo. 53 South | 606-1 | Harvey, Iron, Ill. 73 South | 706-1 |
| St. Paul, Minn. 53 West | 107-1 | Little Rock, Ark. 55 South | 207-1 | Du Quoin, Ill. 73 South | 307-1 | C – O 79 South | 407-1 | Sheldon, Ia. 51 West | 507-1 | St. Louis, Mo. 53 South | 607-1 | Harvey, Iron, Ill. 73 South | 707-1 |
| Minn. Tfr., Minn. 53 West | 108-1 | Jackson Tfr., Miss. 55 South | 208-1 | Cairo, Ill. 73 South | 308-1 | Hamlet, N.C. 79 South | 408-1 | Cherokee, Ia. 51 West | 508-1 | St. Louis, Mo. 53 South | 608-1 | Harvey, Iron, Ill. 73 South | 708-1 |
| Independence, Ia. 53 West | 109-1 | P.H. New Orleans, La. 55 South | 209-1 | Cairo, Ill. 73 South | 309-1 | Roanoke, Va. 79 South | 409-1 | Webster City, Ia. 51 West | 509-1 | St. Louis Tfr., Mo. 53 South | 609-1 | Harvey, Iron, Ill. 73 South | 709-1 |
| Cedar Rapids, Ia. 53 West | 110-1 | Dairy New Orleans, La. 55 South | 210-1 | Mounds, Ill. 73 South | 310-1 | Lynchburg, N&W. 51 West | 410-1 | Barnum, Ia. 51 West | 510-1 | Cotton Belt, Ark. 53 South | 610-1 | Harvey, Iron, Ill. 73 South | 710-1 |
| Manchester, Ia. 53 West | 111-1 | Memphis Pk, Tenn. 55 South | 211-2 | Centralia, Ill. 73 South | 311-1 | Cincinnati, Ohio 79 South | 411-2 | Ft. Dodge, Ia. 51 West | 511-2 | Kansas City, Kas. 53 South | 611-1 | Harvey, Iron, Ill. 73 South | 711-2 |
| Warren, Ill. 53 West | 112-2 | Dairy Memphis, Tenn. 55 South | 212-2 | Champaign, Ill. 73 South | 312-1 | Cincinnati, Ohio 79 South | 412-2 | Omaha, Neb. 51 West | 512-2 | Belleville, Ill. 53 South | 612-1 | Harvey, Iron, Ill. 73 South | 712-2 |
| Rockford, Ill. 53 West | 113-2 | Vicksburg, Miss. 55 South | 213-2 | Edgewood, Ill. 73 South | 313-2 | Cincinnati, Ohio 79 South | 413-2 | U.P. Tfr. 51 West | 513-2 | Springfield, Ill. 53 South | 613-2 | So. Chicago, Ill. 73 South | 713-2 |
| Hudson, N.Y. 79 South | 134-1 | S. Pac. 55 South | 234-1 | Champaign, Ill. 73 South | 331-1 | Crane, Ind. 79 South | 434-1 | Baileyville, Ill. 51 West | 534-1 | Gilman, Ill. 53 South | 634-1 | Bloomington, Ill. 73 South | 734-1 |
| Syracuse, N.Y. 79 South | 137-1 | New Orleans, La. 55 South | 237-1 | Monticello, Ill. 73 South | 337-1 | Raub, Ind. 79 South | 437-1 | Freeport, Ill. 51 West | 537-1 | Ridgeville, Ill. 53 South | 637-1 | Pontiac, Ill. 73 South | 737-1 |
| Syracuse, N.Y. 79 South | 138-1 | New Orleans, La. 55 South | 238-1 | Lodge, Ill. 73 South | 338-1 | Aroma, Ill. 79 South | 438-1 | Freeport, Ill. 51 West | 538-1 | Atchison, Kan. 53 South | 638-1 | Griswold, Ill. 73 South | 738-1 |
| Syracuse, N.Y. 79 South | 139-1 | New Orleans, La. 55 South | 239-1 | Leverett, Ill. 73 South | 339-1 | Norfolk, N.W. 79 South | 439-1 | Freeport, Ill. 51 West | 539-1 | | 639-1 | | 739-1 |
| Syracuse, N.Y. 79 South | 140-1 | New Orleans, La. 55 South | 240-1 | | 340-1 | | 440-1 | | 540-1 | | 640-1 | | 740-1 |
| 53 West 79 South 7:20 P.M. 6:50 P.M. | | 55 South – 7:20 P.M. | | 73 South – 6:30 P.M. | | 79 South – 6:30 P.M. | | 51 West – 7:00 P.M. | | 53 South – 6:10 P.M. | | 73 South – 6:20 P.M. | |

Witnesses:
C. E. Wessels.
B. G. Richards.

Inventor:
Thomas S. Grannis,
By Joshua R. H. Potts
his Attorney.

T. S. GRANNIS.
FREIGHT LOADING MEANS.
APPLICATION FILED APR. 9, 1918.

1,412,861.

Patented Apr. 18, 1922.
5 SHEETS—SHEET 3.

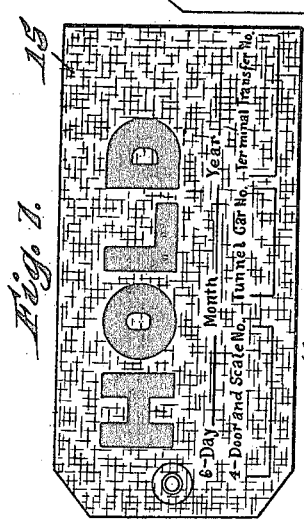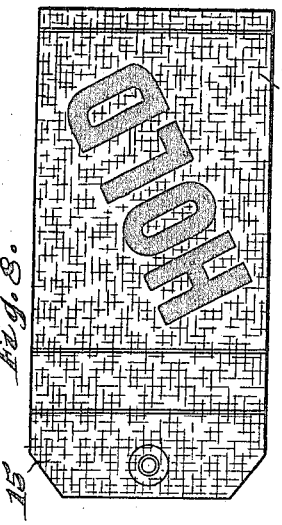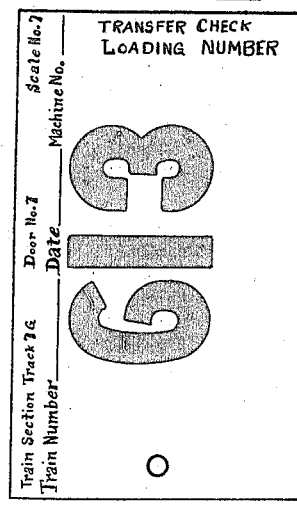

Fig. 10.

HOLD CARD — OUT FREIGHT

CHICAGO ILL.

| 1 | 2 | 3 | 4 | 5 | 6 | 7 |
|---|---|---|---|---|---|---|
| A | B | C | D | E | F | G |
| 101 TO 140 | 201 TO 240 | 301 TO 340 | 401 TO 440 | 501 TO 540 | 601 TO 640 | 701 TO 740 |

SEE LOADING LIST

| | | NOTE NUMBERS | 1 | 2 | 3 | 6 |
|---|---|---|---|---|---|---|
| 1 | Train Section Track | 1st Number | | 2nd Number | | |
| 2 | Division Number | 1st Number | | 2nd Number | | |
| 3 | Train and Loading No. | Tunnel Car No. | | Terminal Transfer No. | | |
| 4 | Door and Scale No. | Station Number or Destination | | | | |
| 5 | Date Released | | Weight | | | |
| 6 | Chicago Ill. | Day | Month | | Year | |

No. _____ Check Request Number Give Information Received _____

Load With This Tag Which Will Show Cause Of Delay

Request On Shipper

| For Correct Destination | | R On S | 1 |
|---|---|---|---|
| For County | | R On S | 2 |
| For State | | R On S | 3 |
| For Per Pay | | R On S | 4 |
| For Orders | | R On S | 5 |
| For Authority | | R On S | 6 |
| For Inspection | | R On S | 7 |
| For Other Causes | | R On S | 8 |

| One Card With Shipment | One Card To Shipper | One Card on File |
|---|---|---|

UNITED STATES PATENT OFFICE.

THOMAS S. GRANNIS, OF HOMEWOOD, ILLINOIS.

FREIGHT-LOADING MEANS.

1,412,861.  Specification of Letters Patent.  Patented Apr. 18, 1922.

Application filed April 9, 1918. Serial No. 227,551.

*To all whom it may concern:*

Be it known that I, THOMAS S. GRANNIS, a citizen of the United States, and a resident of the village of Homewood, county of Cook, and State of Illinois, have invented certain new and useful Improvements in Freight-Loading Means, of which the following is a specification.

My invention relates to improvements in freight loading means, and has for its object the provision of improved means for facilitating the loading of freight in large freight centers.

The invention consists in the parts and combinations and arrangements of parts hereinafter described and claimed.

The invention will be best understood by reference to the accompanying drawings forming a part of this specification, and in which, Fig. 1, is a face view of one side of a loading list employed in the system, Fig. 2, a view of the reverse side of the said list, turned up side down, Fig. 3, a face view of one side of a sheet of record tickets employed in the system, Fig. 4, a view of the reverse side of said sheet, Fig. 5, a face view of one side of a shipping tag employed in the system, Fig. 6, a view of the reverse side of said shipping tag, Fig. 7, a face view of one side of a hold or retaining tag employed in the system, Fig. 8, a view of the reverse side of said holding tag, Fig. 9, a face view of a transfer tag employed in the system, and Fig. 10, a face view of a hold or retaining card employed in conjunction with the tag illustrated in Figs. 7 and 8.

The preferred form of construction, as illustrated in the drawings, comprises a sheet 11 made up in the form of a tabulated loading list, as indicated in Figs. 1 and 2. This sheet 11 is adapted to be suspended in any suitable manner on a wall or the like, with the side or face illustrated in Fig. 1 facing outwardly, as shown. The other side of the sheet 11 is provided with substantially the same table but arranged reversely or up side down, with respect to the table on the outer face, so that when the lower edge of the sheet is swung upwardly, said table is positioned upright or correctly for reading. The table on the outer face of sheet 1 is labeled with the words "Initials" and "Car numbers" while the table on the rear of said sheet is labeled "Station" and "District numbers". Each table is made up of a plurality of columns corresponding with the number of loading tracks in the freight depot or loading center, but for convenience, the columns and tracks are consecutively numbered and lettered as shown, the tables illustrated being designed for use with seven loading tracks. At the top of each column provision is also made for the insertion of a train section in case the train is run in sections. Under the system, the same train is always loaded on the same track, and the names of the stations or destinations reached by the trains from each track are printed in the corresponding columns, as indicated, the name of any particular station being repeated as many times as there is likelihood for the requirement of a separate car for such stations. Thus, for instance, for a large city such as St. Louis, provided for in the sixth column labeled at the top "Track 6—F" the station name "Saint Louis, Mo." is repeated four times indicating that there is likelihood for the requirement of four cars for freight for St. Louis, whereas "Belleville, Ill." is printed but once, being a small town and requiring but one car to transfer the freight thereto. In assembling the different cars in the different trains on the different tracks, the cars for each train are arranged in divisions of ten cars each, and the divisions consecutively numbered, thus, if the normal train leaving at a certain time and being loaded on track No. 1 consisted of thirty-six cars, these cars would be arranged in three divisions of ten cars each, and another division containing but six cars, each division being separated by a space on the track to facilitate access to each side thereof for loading purposes, and the cars in each division being consecutively numbered to correspond with that track and division. A block of numbers corresponding to the track is assigned for use on that track, thus all cars on track No. 1—A will be numbered from 101 upwardly, all cars on track 2—B will be numbered from 201 upwardly, and so on, the numbers assigned to the cars thus indicating at a glance the track on which they may be found. Likewise, the cars in each division on a track are systematically and constantly numbered to indicate that division. Thus all cars in division No. 1 on track No. 1, are numbered from 101 to 110, division No. 2 from 111 to 120, division No. 3 from 121 to 130, and so on, for each division and for each track, the table indicated being prepared for four divisions on each track, although of course this system of numbers might be readily extended in case more divisions were necessary. The cars for each station and destination are always similarly placed on each track and each division, and the loading list, as indicated, may be permanently prepared and printed, the special numbers thus given to each car being arranged in a column immediately to the left of the station numbers opposite the names of the stations and the division being additionally indicated, although that is unnecessary inasmuch as the loading number thus assigned to the car or cars for each station in itself indicates the track number or the divsion of that track and the position of the car in the division, thus permitting the "machine man" or a man who carries the freight to the cars to tell at a glance where the freight should be taken. Each train number is also indicated opposite each station name in a column to the left of that containing the loading numbers, although such indication would obviously be only of necessity or convenience in "breaking in" new employees, as old employees would instinctively know where the trains were located. For convenience also, at the bottom of each column is arranged the number of the train or trains covered by that column and the time of leaving.

In large freight depots or freight loading centers, it is customary to provide a number of receiving doors, each equipped with a scale for weighing the freight received and in charge of a clerk who, for convenience, may be termed the receiving clerk. Each of these receiving clerks is adequately supplied with blank loading lists above described, for use each day, and is also supplied with sets of record tickets 12 indicated in Figs. 3 and 4, supplied in triplicate in a sheet or strip separated by lines of perforations 12'. Each of the tickets thus provided on each sheet is marked on one side with the door number and with the words "Original," "Duplicate" and "Triplicate" as shown in Fig. 4, together with the words "Stowman's receipt," "Machine receipt" and "Door and scale receipt." On the reverse side each of these receipts or tickets is printed with the date of the month, said sheets being provided in thirty-one different sets thus providing for each day of the month, and each is also provided with a list of the months, whereby the month may be indicated by a punch or check mark. Each receipt or ticket is also provided with a system number, as shown, and these system numbers are identical on each ticket or receipt but are consecutively arranged or numbered on the different sheets of tickets or receipts so that the different tickets or receipts may be readily reassembled and compared. A list of numerals from 1 to 6 is also provided at one side of each ticket or receipt, which list is provided for the convenience of the receiving clerk and may be checked to indicate information as desired.

Likewise, each receiving clerk is provided with shipping tags 13 shown in Figs. 5 and 6, said tags being provided on one side, as indicated, with blank spaces suitably marked for the indication of the date, the door number, the scale number, the train section, the track, the train number and loading number, and also with a table for indicating the train division. This table is divided into four columns labeled respectively at the top, 1, 2, 3 and 4, indicating the separate train divisions, the parts illustrated being designed, as explained above, for four divisions which will ordinarily be ample. Immediately below each of the division numbers in each column is arranged a general indication as to the numbers falling in that division, those in division 1 being from 601 to 610 on track 6, for which the tag in question is prepared, separate tags being provided for each separate track. Likewise, such an indication is made under each of the other division numbers, and below are placed the separated load numbers in each division, as shown. The reverse side of the tag 13 is provided with the track number and means for indicating the train section, car initials, car number, station number, district number and final destination, as shown. The parts already described are sufficient to take care of the usual and ordinary freight shipments.

In use, the loading lists indicated in Figs. 1 and 2 are first filled out under the names of the various stations with the initials of the car, and the official car numbers of the different cars in the different divisions on the different tracks. Such an indication has been made in the sixth column labeled at the top track 6—F for a car belonging to the Chicago North and Western Railway Company, No. 9614, which appears as having been placed on track No. 6, division No. 2, as the third car in that division which is indicated by the number immediately to the left of the name of the station "Springfield, Ill.", the car destined for Springfield, Illinois, being always given the same loading number, but might, of course, have different initials indicating the road to which it belongs and a different official number given by that road, or more particularly analyzing the number 613—2; the 6 is a track number, meaning track No. 6; 13 is the division number, meaning division No. 2, and 3 is the number of the particular car in division No. 2. The 2 also indicates the division as being Division No. 2. The table on the reverse side of the sheet 11 is similarly filled out with the station and district numbers, Springfield, Illinois, being indicated as being assigned station number D—112 and being located in District No. 3, such designation being arbitrarily given simply for convenience in designation and otherwise. The tables on sheet 11 are thus filled up with the requisite information for each car in each division on each tag, the information which is universally used for each car being arranged on the outer face of the sheet and being the initials and car numbers, and that only occasionally used being arranged on the reverse side and being the station and district numbers. Thus, the receiving clerk may tell at a glance the universal loading information required for each freight shipment, and, when necessary, may obtain the occasional information as to the station and district numbers by simply raising the lower edge of the sheet as it hangs on a wall or the like. With this information at hand, when a freight shipment is received, the receiving clerk first fills out the three tickets on one of the sheets or strips 12 with the loading number assigned to the proper car, as learned from his loading list, and punches the month, the strip corresponding to the day being of course selected. The receiving clerk retains the triplicate ticket or receipt thus filled out and passes the other two to the "machine man" or man whose duty it is to move the freight from the receiving door or station into the car, the "machine man" retaining the duplicate and delivering the original to the "stowman" who is the man who actually loads the freight into the car. The different tickets or receipts on the strip or sheet 12 have been filled out with the loading number 613—2 corresponding with the car for Springfield, Illinois, indicated on the table, and which furnishes sufficient information for a complete loading record on each man who touches the shipment. The receiving clerk also fills out one of the tags 13 indicated in Figs. 5 and 6 with the information as indicated, utilizing the division table for determining the loading number and checking said loading number as shown, and such shipping tag is attached directly to the freight shipment, thus furnishing complete information to everybody connected with the railroad so as to insure the accurate delivery of the freight and accurate tracing thereof in case of accidents or miscarriage. By this means and arrangement, the freight may be efficiently and expeditiously loaded, and complete records made and kept thereof, thus greatly facilitating loading and readily and instantly fixing the blame for mistakes. Mistakes will, of course, sometimes happen, and for this purpose transfer tags 14 are provided, as illustrated in Fig. 9, each permanently printed with the various car and train section track numbers, and door and scale number, and provided with means for indicating the train number, date and machine number, such tag being filled out and attached to the shipment when it is necessary to transfer the same in case of a mistake.

It is also necessary, sometimes, to hold the freight for further information from the shipper, and to this end I provide tags 15 illustrated in Figs. 7 and 8, and hold cards 16 in triplicate, indicated in Fig. 10. The hold tags 15 are distinctively colored and permanently printed on both sides with the word "Hold" indicating directions to retain the freight, and also with means for indicating the date, door and scale number, tunnel and terminal transfer number, as shown. The hold card is provided, as shown, with columns at the top for convenience in determining the various loading numbers and also with lists for indicating the original and new train section, track, division, number, and holding number, door and scale number, date released, weight, receiving depot, and the date on which filled out, also with a list of requests on the shipper suitably numbered at the right, requesting the corrected destination, pay, orders, authority, inspection, or other causes. In case it becomes necessary to retain a shipment for any reason, a hold card is filled out in triplicate, as indicated, and one card attached to the shipment, one card sent to the shipper and one placed on file, thus preserving a complete record of the transaction, as will be readily understood.

While I have illustrated and described the preferred means and manner for carrying my invention into effect, these are capable of variation and modification without departing from the spirit of the invention. I, therefore, do not wish to be limited to the precise details set forth, but desire to avail myself of such variations and modifications as come within the scope of the appended claims.

Having described my invention, what I claim as new and desire to secure by Letters Patent is:—

1. Freight loading means, comprising a reversible sheet provided on one side with a table arranged in a number of columns giving loading information and on the other.

2. Freight loading means, comprising a reversible sheet provided on one side with a table arranged in a number of columns giving loading information and also with blank spaces in which are entered marks identifying articles shipped and the car in which shipped, and on the other side with a reversely arranged table giving additional loading information; and record tickets, in triplicate, having means thereon for identifying articles shipped and the car in which shipped, substantially as described.

3. Freight loading means, comprising a single sheet provided on one side with a table giving loading information and also with blank spaces in which are entered marks identifying articles shipped and the car in which shipped, and on the other side with a reversely arranged table giving additional loading information; record tickets, in triplicate, having means thereon for identifying articles shipped and the car in which shipped; and shipping tags to be attached to articles shipped, bearing means for indicating the train, car, and final destination thereof, substantially as described.

4. Freight loading means comprising a single sheet provided at one side with a table giving loading information and also with blank spaces in which are entered remarks identifying articles shipped and the car in which shipped, and on the other side with a reversely arranged table giving additional loading information; record tickets having means for identifying articles shipped and the car in which shipped; and shipping tags to be attached to articles shipped, bearing means for indicating the train, car and final destination thereof, substantially as described.

5. Freight loading means, comprising a single sheet provided on one side with a table giving loading information and also with blank spaces in which are entered marks identifying articles shipped and the car in which shipped, and on the other side with a reversely arranged table giving additional loading information; record tickets, in triplicate, having means thereon for identifying articles shipped and the car in which shipped; hold tags distinctively colored and bearing means for identifying articles; and hold cards, in triplicate, each bearing means for identifying the train, car, and reason for delay, substantially as described.

6. Freight loading means comprising a single sheet provided at one side with a table giving loading information and also with blank spaces in which are entered remarks identifying articles shipped and the car in which shipped, and on the other side with a reversely arranged table giving additional loading information; record tickets having means thereon for identifying articles shipped and the car in which shipped; hold tags bearing means for identifying articles; and hold cards each bearing means for identifying the train, car, and reason for delay, substantially as described.

7. Freight loading means, comprising a single sheet provided on one side with a table giving loading information and also with blank spaces in which are entered marks identifying articles shipped and the car in which shipped, and on the other side with a reversely arranged table giving additional loading information; record tickets, in triplicate, having means thereon for identifying articles shipped and the car in which shipped; and a transfer tag bearing the car number, train number and other means of identification, substantially as described.

8. Freight loading means comprising a single sheet provided on one side with a table giving loading information and also with blank spaces in which are entered remarks identifying articles shipped and the car in which shipped, and on the other side with a reversely arranged table giving additional loading information; record tickets having means thereon for identifying articles shipped and the car in which shipped; and a transfer tag bearing the car number, train number, and other means for identification, substantially as described.

9. Freight loading means comprising a single sheet provided on one side with a table giving universal loading information and also with blank spaces in which are entered marks identifying articles shipped and the car in which shipped, and on the other side with a reversely arranged table giving occasional loading information; record tickets, in triplicate, having means thereon for identifying articles shipped and the car in which shipped; shipping tags to be attached to articles shipped, bearing means for indicating the train, car, and final destination; hold tags distinctively colored and bearing means for identifying articles; hold cards in triplicate, each bearing means for identifying the train, car, and reason for delay; and transfer tags bearing the car number, train number, and other means of identification, substantially as described.

10. Freight loading means comprising a single sheet provided on one side with a table giving universal loading information and also with blank spaces in which are entered remarks identifying articles shipped and the car in which shipped, and on the other side with a reversely arranged table giving additional loading information; record tickets having means thereon for identifying articles shipped and the car in which shipped; shipping tags to be attached to articles shipped, bearing means for identifying the train, car and final destination; hold tags bearing means for identifying articles; hold cards bearing means for identifying the train, car and reason for delay; and transfer tags bearing the car number, train number and other means of identification, substantially as described.

In testimony whereof I have signed my name to this specification in the presence of two subscribing witnesses.

THOMAS S. GRANNIS.

Witnesses:
 JOSHUA R. H. POTTS,
 HELEN F. LILLIS.